May 14, 1968 H. VILAIN 3,383,290

MALTING PROCESS

Filed April 7, 1965

Inventor
Henri Vilain
by Michael J. Striker
Atty

Inventor
Henri Vilain
by Michael S. Striker
Atty.

May 14, 1968 H. VILAIN 3,383,290

MALTING PROCESS

Filed April 7, 1965 3 Sheets-Sheet 3

INVENTOR
HENRI VILAIN

United States Patent Office 3,383,290

Patented May 14, 1968

1

3,383,290
MALTING PROCESS
Henri Vilain, 7 Spitzackerstrasse, Bottmingen, Basel-Land, Switzerland
Continuation-in-part of application Ser. No. 250,730, Dec. 27, 1962. This application Apr. 7, 1965, Ser. No. 446,374
Claims priority, application France, Dec. 29, 1961, 883,456, Patent 1,320,049
12 Claims. (Cl. 195—71)

ABSTRACT OF THE DISCLOSURE

Simultaneous steeping and germinating of barley is carried out by sequentially immersing barley for a short period of time in water so as to increase the water content of the barley only by a friction of the total increase in water content intended during the malting process, followed by freely dropping the thus treated barley to a lower level while simultaneously spraying the dropping barely with water so as to substantially evenly further moisten the individual kernels thereof, allowing the thus treated and incompletely steeped barley to rest under conditions permitting germination; and repeating immersing, spraying and resting until steeping and germination are completed under formation of green malt substantially ready for kilning.

The present application is a continuation-in-part of my co-pending application Serial No. 250,730, now U.S. Patent No. 3,188,280, filed Dec. 27, 1962, and entitled Device for a combined Steeping and Germinating Multi-Process.

The present invention relates to a malting process and, more particularly, to a malting process in which the steps of steeping and germinating the grain are combined.

Conventional malting processes consist of the following stages: steeping, germinating and kilning.

During the steeping process, the grain is completely immersed in water, irrespective of the method or apparatus employed, over a fairly substantially period of time totalling approximately 15 hours under water with periods of continuous immersion of at least two hours. The steeping process is followed by the germinating process which is conducted in different types of equipment and in different rooms.

Under natural conditions, the grain is not intended to live under water, and furthermore, the factors of vital activity which are to be considered in the germaniting of a grain are water, temperature, and the access of oxygen and carbon dioxide. These factors must be considered jointly and not individually and separately.

It is therefore an object of the present invention to provide a steeping and germination process which more closely simulates natural conditions.

It is a further object of the present invention to provide a combined steeping and germinating process which can be carried out in one and the same equipment, in a relatively short period of time and in a simple and economical manner.

Other objects and advantages of the present invention will become apparent from a further reading of the description and of the appended claims.

With the above and other objects in view, the present invention contemplates in a malting process the steps of contacting grain for a short period of time with water so that the amount of water adhering to the grain will suffice only to increase the water content of the grain by a fraction of the total increase in water content intended during the malting process, thereafter allowing the moist

2 grain to rest for a considerable length of time in contact with air so as to allow the adhering water to enter the grain and so that any residual film of water on the grain will not prevent gaseous exchange between the grain and the surrounding atmosphere, and repeating the application of water to the grain for very short periods of time followed by resting of the grain for prolonged periods of time so that in each of the moistening steps the water content of the grain is increased until after the last moistening step a desired maximum water content has been reached while in the resting periods between successive moistening steps enzyme formation and germination of the grain may progress, thereby simultaneously steeping and germinating the grain.

Thus, according to the present invention, the time of each treatment under water is reduced in such a manner so as to obtain periods of immersion of less than 30 minutes, in fact as short as about 30 seconds in many cases; furthermore germination is initiated before the steeping treatment is terminated, by properly controlling the temperature and allowing access of air to the individual grains so that a gaseous interchange between oxygen and carbon dioxide may take place.

The steeping treatment is continued during the germination itself and thus permits the maltster to direct the processes which result from the germination of the grain by modifying the moisture content of the latter.

The up to now practically absolute separation between the steeping and germinating process is eliminated in accordance with the present invention.

This and other objects are accomplished in accordance with the present invention by a combined steeping and germinating process which essentially consists, while at the same time maintaining the regularity of germination as required by the art, in increasing with controlled precision the moisture of the grain between the commencement of steeping up to the kilning stage by virtue of a moistening treatment performed on a small quantity of grain under the same conditions of temperature, oxygen and carbon dioxide as those which prevail during a germinating process of known type, in such manner as to cause the germination to commence as soon as possible with the minimum quantity of water.

In accordance with a further feature which may be provided by the present invention, the moistening treatment performed on small quantities of grain is carried out on the grain in a fine layer.

A device useful for the practical application of the above process comprises a germinating bin, means for displacing the grain in the said bin such manner that the said grain circulates in a small volume and means for moistening the grain during its displacement.

The device referred to above may comprise one or a number of the following features:

(a) The means for displacing the grain in such manner that the said grain circulates in a small volume consists of at least one continuous-movement bucket-chain, the top run of which is horizontal;

(b) Means are provided for preventing the grain from coming into contact with the chain, so that the moistened grain is not crushed by the toothed wheels and the chains;

(c) The means in accordance with Section *b* above consist of a housing located beneath the buckets, to which the grains cannot gain access and inside which the chain moves;

(d) The means for moistening the grains consist of a series of sprinkling orifices located above the horizontal run of the bucket-chain along which the immersion of the grain in water takes place for a very short period of time which is less than five minutes;

(e) The means for moistening the grains consist of a series of water sprayers or atomizers which are placed in such manner that the grains are moistened as and while they freely drop downwards after having been discharged from the buckets, thereby satisfying the condition which requires that this moistening operation should be quite homogeneous and uniform.

In order that the invention may be more clearly understood, there will first be described below by way of non-limitative example one form of embodiment of the device for the practical application of the process in accordance with the invention, reference being made to the accompanying drawings to different scales, in which.

Figure 1:
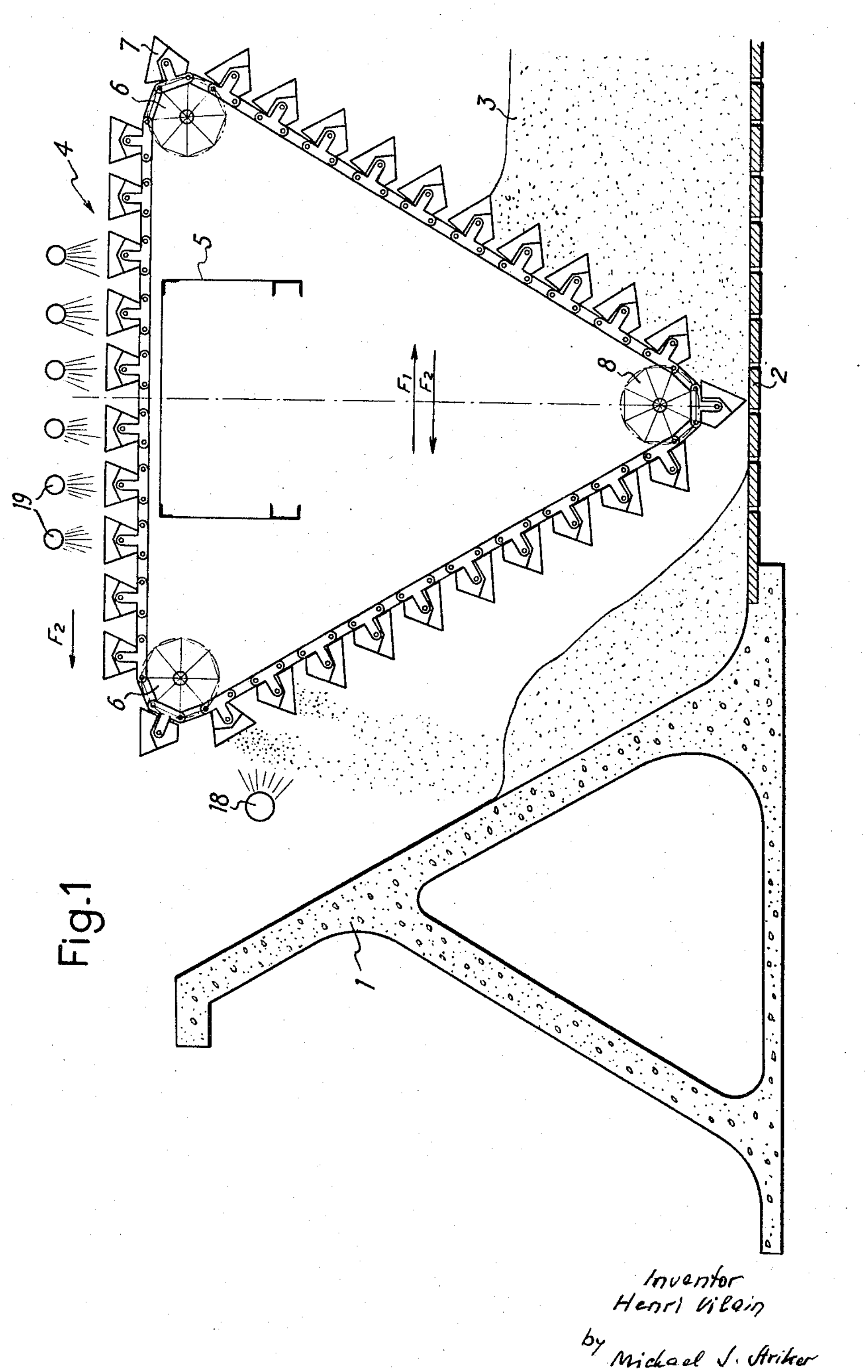
FIG. 1 illustrates in partial longitudinal cross section a germinating bin in which is mounted a device for displacing and wetting the grain.
Figure 2:
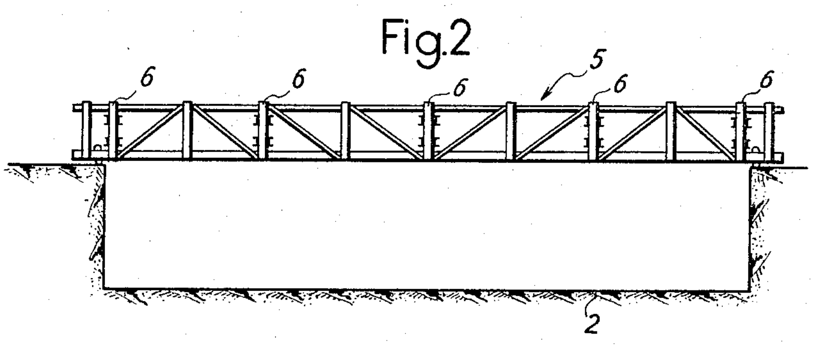
FIG. 2 is a diagrammatic transverse cross section of the germinating bin showing the overhead travelling bridge which carries the device referred to above.

The germinating bin, of which FIG. 1 is a partial longitudinal cross section, has been illustrated diagrammatically by a wall structure 1 of concrete and by a perforated base 2. A bucket-chain device 4 having a generally triangular shape is adapted to move in the barley which is designated by the reference 3, and is mounted on an overhead travelling bridge 5 is such manner that the top run of the said bucket-chain is horizontal.

The said traveling bridge is provided with five toothed wheels 6 over which pass five bucket-chains. Between the said five chains are mounted buckets 7 each having, for example, a length of 2.5 metres in such manner as to sweep the full width of the bin, namely a width of approximately 10 metres. Each chain also passes over a bottom toothed wheel 8, as shown in FIG. 1, with the result that the combined unit has the shape of an isosceles triangle, the apex of which is located at the bottom. For the sake of clarity, there has not been shown in the drawings the system of assembly of the bottom pulleys, which obviously move at the same time as the overhead travelling bridge to which they are coupled.

In short, the device comprises four groups of buckets which are each supported between two chains, the buckets being coupled together in such manner that four buckets placed horizontally in line one after another make up one unit. It will nautrally be understood that it would be possible to devise a single bucket of appropriate length for the purpose of sweeping the full width of the bin. It has been found preferable to adopt the solution of bucket elements which are secured to each other solely for the purpose of facilitating construction. However, this solution could give rise to a disadvantage in that, if no precautions were taken, the moistened grains would come into contact with the chains and would accordingly be crushed between the toothed wheels and the chains.

In order to overcome the above mentioned disadvantage, provision has been made to isolate the chain with respect to the buckets. To this end, the buckets are coupled to each other in the horizontal direction by a fork joint 9. The said fork joint is formed by two thick folded plates, the free extremities of which are applied one against the other, for example by means of two nuts 10 which are screwed onto a bolt 11 which passes through the two plates. There has thus been formed in the interior of the fork joint a housing in which is mounted a spindle 12 which supports the fork joint and consequently the buckets. On the said spindle is pivotally mounted the stem 13 of a T-piece 14 which is fixed at 15 on one of the chains 16.

Figure 3:
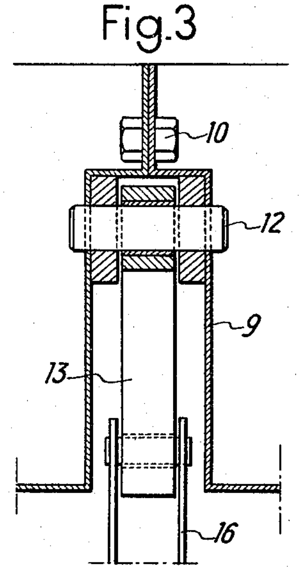
FIG. 3 is a transverse cross section taken along the line III—III of FIG. 4 which passes through the junction of two buckets of the device referred to above.
Figure 4:
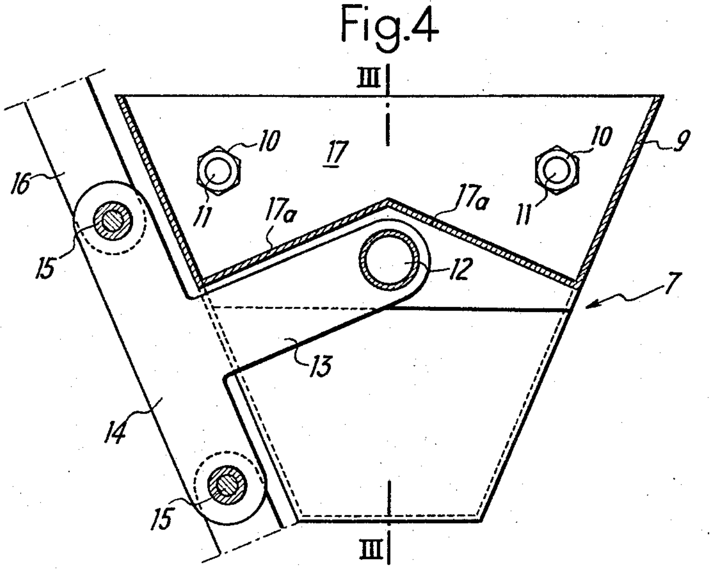
FIG. 4 is a side view of a bucket.

As shown in FIGS. 3 and 4, those grains which are liable to fall on the top portion of the fork joint 9 which forms a kind of half-bucket 17 are unable to reach the chain 16. Furthermore, by virtue of the double slope of the bottom 17*a*, 17*a* of the half-bucket 17, the grains which are subsequently deposited therein will readily be evacuated therefrom as and when the bucket swings over.

In accordance with the form of embodiment which is illustrated in FIG. 1, a surface portion of wall 1 closely corresponds to the path which is described by the end portions of the buckets. It wil be understood that the travelling bridge which starts from the left hand side of the drawing, for example, moves forwards in the direction of the arrow $F_1$, while the chain accordingly moves in the direction of the arrow $F_2$ along the horizontal run of the said chain. The buckets tilt over when they arrive at the top and on the left hand side as shown in the figure, by virtue of an abutment member which has not been illustrated. The said buckets are then overturned by means of a guide shoulder which has not been illustrated in the drawings. At the moment when each bucket tilts over, the grains fall downwards freely, pass beneath a moistening apparatus 18 of known type and then form a new pile as shown on the left hand side of the figure.

It should be noted that the angle of slope of the upwardly moving and downwardly moving chains is such that, after the free drop of the grains has taken place, these latter cannot be caught up again by the buckets.

The above-mentioned process continues until the overhead travelling bridge reaches the right hand extremity of the bin with reference to the figure. At this moment the travelling bridge and the chains perform a reverse movement, the said bridge accordingly moving in the direction $F_2$ while the bucket chains move in the direction $F_1$.

If it is desired to moisten the grain by immersion over a very short period of time which is less than five minutes, provision is made for the use of a plurality of sprinkling orifices 19 which are located above the chains. The buckets which already contain grain are then filled with water.

As will be understood, at the commencement of the operation and after the first pile has been formed, each grain is covered over with water and has received a quantity of water which is sufficient for the germination to commence. It has naturally been ensured that, prior to the operation in accordance with the invention, the grain has been immersed and washed by a certain number of operations involving the filling and emptying of water either in the germinating bin itself or in another tank, such operations having been carried out over a period of a few hours in order to rid the grain of its inhibiting substances. After this preparation, the grain has been removed from the tank if another tank was employed and then placed in the bin in which is located the divice in accordance with the invention so that the grain may thus be placed under all the optimum conditions of germination.

The grain thus begins to sprout and this increase in vital activity is maintained by causing the device to operate in such manner as to provide very brief immersions or aspersions of water while supplying fresh air at a suitable temperature.

The moisture of the grain accordingly increases and this increase in moisture is accompanied by a corresponding increase in the development of the respiratory process and the degree of germination of the grain as well as in the formation of enzymes in the grain. During this stage, when the awakening of vital activity takes place in all its forms, water exercises its activating function both on the life of the germ and on the enzymes. The fact must not be overlooked that the object in view is to achieve a certain degree of vitality with the minimum amount of water. It is for this reason that the grain does not receive more water than it requires in order that this object should be pursued and achieved in the minimum time. When the maximum level of vitality is reached, the grain no longer receives any water which it would very soon require for the continuation of the germination process. The grain accordingly enters into the full solubilization stage and the respiratory process is thus caused to fall off rapidly, thereby reducing the malting loss.

In order to obtain the maximum desired quantity of enzymes with the minimum quantity of water, it is essential to ensure optimum conditions under which the grain is supplied with oxygen and carbon dioxide. These conditions are easily satisfied by virtues of the device which has been described above, or by means of any like device which provides immersion for a very short time, while the spraying treatment permitted by means of the said device is very uniform and homogeneous since it is effected when the grain is disposed in a fine layer. In short, every effort is made at the outset to produce germination of the grain with the maximum vital activity, thereby resulting in a substantial development of enzymes. After formation of the enzymes, it is then possible to reduce germination by virtue of a moisture content which is best suited to this purpose, which in turn results in a reduction in the rootlets while the biochemical activity remains satisfactory.

It should be noted that the fact of being able to increase the moisture of the grain at will during the solubilization phase is also a favorable factor.

In the malting process conventionally barley is immersed in water of 11–12° C. It takes about 60 hours for barley of 16% moisture content to absorb 51% of its weight of water. The moisture content of the barley is then about 44.3% and this is a desirable moisture content for the next following step of the conventional malting process, namely the germination.

However, after 48 hours of soaking, the grain, i.e. the barley, is capable of giving up 100 mg. of carbon dioxide per kilogram of dry grain per hour. Since the coefficient of respiration equals about 2, the grain is therefore capable of absorbing between 70 and 80 mg. oxygen per kilogram hour. On the other hand, it requires one liter of water to immerse one kilogram of dry barley and one liter of water contains only about 7.4 mg. oxygen, just enough oxygen for 6–10 minutes of respiration of the barley. Actually, the barley consumes much less oxygen from the water in which it is immersed due to the low concentration of the oxygen therein. There is clear a risk of the grain to suffocate and the maltster fights against this risk by renewing the water and by blowing in air. However, in whatever way this is done, the grain cannot receive all of the oxygen which it would be capable of consuming, while it is surrounded by water. Grains, and particularly barley, are not equipped to develop in a natural manner while being immersed in water.

Thus, the problem which is to be solved, and which is solved according to the present invention, is how to give water to the grain and permit the grain to absorb water, without interfering with the exchange of oxygen and carbon dioxide by which the grain breathes.

If one considers what happens to the grain in the soil, i.e. in its natural habitat, a solution to this problem will be indicated. In effect, between the grain and the surrounding soil there is an exchange of water leading to an equilibrium due to the role played by the soil. The soil acts like a blotter. When the grain is covered with water, the soil absorbs the excess water and, in the opposite manner, the soil gives up water to the grain in proportion and to the extent required by the grain.

This can be easily seen in an experiment made in a flower pot, the bottom portion of which is soaked in water. The upper portion of the pot and the soil therein are not immersed in water but the soil in the upper portion remains constantly moist and the grains which will be located in the upper portion of the soil in the flower pot will be supplied at all times with the amount of water required without being completely immersed in or coated with water, but so as to be always in optimum condition for the exchange of oxygen and carbon dioxide.

As the grain absorbs more water, its gas exchange increases and becomes more important. This is the reason why the present invention, as will be described in further detail below, provides for two different soaking processes, namely first a series of simple immersions of the grain each lasting for a short period of time such as about 30 seconds and preferably not more than a very few minutes, and secondly, the spraying of the grain with water while the grain drops freely from a higher to a lower level.

The series of very short immersions is carried out only at the beginning of the soaking process because at this time the grain absorbs the water very fast and the gas exchange is still very weak. With respect to spraying the grain while it drops freely, forming a fine layer as described in connection with the description of the apparatus, it closely proximates the conditions described above with respect to grain located in the soil. It has only one purpose, namely to give water to the grain as required by the same. It is the task of the maltster to control the amount of water used for spraying by controlling the water pressure of the sperayr. For this type of soaking it is necessary that the grain is exposed to the sprayed water while dropping freely after having been discharged from the buckets so that in fact every grain receives its share of water without being entirely coated with a film of water, and it is important to avoid that the grains are completely under water in order not to retard the gas exchange but to favor the life processes of the grain including the formation of enzymes, both as to quality and quantity.

According to the present invention, germination will start at a rather low moisture content of the grain while at the same time providing optimum conditions for enzyme formation. It permits also thereafter to increase the moisture of the grain towards the end of the germination in order to increase the activity of the enzymes and to favor the dissolution of protein material in the grain while at the same time having in the finished product a high enzyme content and a lower than normal degree of germination.

By way of example only and with reference to FIG. 5, the process may be described as follows.

The grain which is placed on the perforated bottom sheet of the germinating bin is pickeed up by the buckets of the apparatus described further above. The apparatus moves in two ways, namely by rotation like a bagger so as to take the buckets containing the grain to the upper horizontal portion where they will be filled with water, and secondly, in a forward manner so as to sweep over a period of time the entire surface of the perforated sheet. When the apparatus reaches the end of the malting floor, the direction of rotation and forward movement are reversed and after such adjustment the apparatus may again pass through the grain.

The grain is placed on the perforated sheet so that air may traverse the layer of grain and water may flow through the same.

Figure 5:
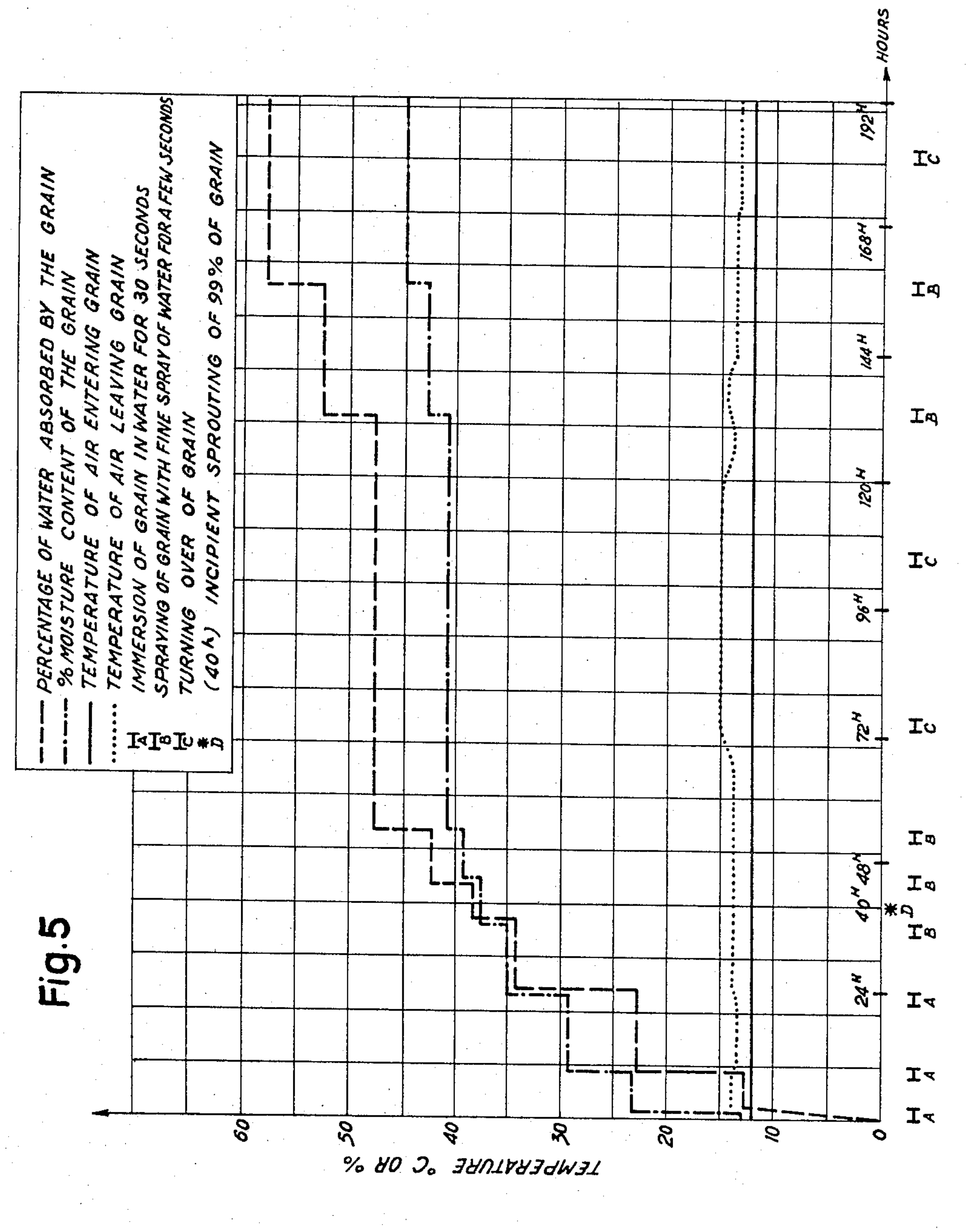
FIG. 5 is a graphic ilustration showing, by way of example only, the carrying out of the process of the present invention.

Referring now to FIG. 5, the lines A indicate the periods of movement of the apparatus and that during such movement the buckets containing the grain while moving in top horizontal position are filled with water. The immersion of the individual portion of grain in one bucket lasts for about 30 seconds. These lines idicate two hours of movement, which is the time necessary for the apparatus to sweep the entire surface of the perforated base of the germination bin.

The lines B indicate the periods of movements of the apparatus without immersion but during which the grains are sprayed with water during their free fall from the buckets down to the bottom of the germination bin. This spraying is carried out as illustrated in FIG. 1 of the drawing.

The lines C indicate the periods of movement of the apparatus without immersion and without spraying which are carried out in order that the grains will not form a coherent mass by interlocking of their rootlets.

The asterisk D which is located at 40 hours indicates the time when chitting of the grain occurs, i.e., the time when rootlets appear on 99% of the grains. These rootlets as well as the primary buds (the future stalks of the plants which would grow out of the grains) grow for four days and then they remain at that stage. At the end of germination, the length of the rootlets is about 2 centimeters and the primary buds have a length of about one-half to two-thirds the length of the grain.

The full line at 12° C. indicates the temperature of the air before entering the mass of grain and the dotted line which varies between about 13 and 15° C. indicates the temperature of the air leaving the grain.

The amount of air which is blown through the grain equals between 60 and 70 cubic meter per 100 kilograms of barley which are treated during the 192 hours of the process. For producing malt of the pilsen beer type, it is preferred that the entrance temperature of the air is 12° C., but the entrance temperature may vary between 9 and 20° C., depending upon the atmospheric conditions and the conditioning of the air and also on the type of malt which is to be produced.

The dot-dash line indicates the stepwise development of the moisture content of the grain, and the dash-dash line indicates the percentage of water absorbed by the grain. This last line shows the quantity of water to be given to 100 kilograms of grain to be processed. Thus, for the last spraying, this absorbed water rises from 52.6% to 58.1%, which means that for 100 kilograms of grain processed one arrives at 152.6 kilograms to which 5.5 kilograms of water are to be added so that the initial 100 kilograms of grain have not reached a weight of 158.1% and, at the same time, the moisture content rises from 43% to 45%. These figures are preferred, but they might vary, according to the year and the type of malt, also the final moisture content may vary between 40 and 47% of water.

Moisture content, as the term is used herein, is to be understood as the percentage of water contained in the grain, while the term "absorbed water" means the quantity of water in kilograms which has been absorbed by 100 kilograms of initial barley weight.

Accordingly, if 100 kilograms of barley grains having a moisture content of 14% absorb 43.3 kilograms of water, the moisture content will then be 40%. By immersing the 100 kilograms plus the 43.3 kilograms, the absorbed water will be 43.3 plus 13 for a total of 56.3 kilograms of water and the moisture content will become 45%.

As shown in FIG. 5, barley having an initial moisture content of 11% is passed through the first immersion step and will be immersed in water in the horizontally travelling buckets for about 30 seconds. The grain is then allowed to rest for eight hours and due to the immersion the moisture content will have risen to 23%.

Thereafter the second immersion takes place in a similar manner raising the moisture content to 29% and the grain is allowed to rest for 14 hours. This is followed by the third immersion step in which the moisture content of the grain is raised to 35% and after which the grain will rest for 13 hours. Now follows the first spraying in which the moisture content is raised to 37% and this is followed by the resting of the grain for nine hours. During this resting period, and after about 40 hours after the start of the process, incipient sprouting of 99% of the grain will take place. Now follows a second spraying again increasing the water content of the grain by 2% to a total of 39% and after a resting period of eight hours a third spraying is carried out raising the water content to 41%. Now for a period of 79 hours no water is added in any form, however, the bucket apparatus will operate several times in order to prevent the forming of an interlocking mass of the sprouting grain. After 79 hours the fourth spraying is carried out raising the water content to 43% and after further resting for 24 hours a final spraying will raise the water content to 45%. Further resting for 37 hours is interrupted by movement of the bucket apparatus to prevent formation of an interlocking mass of the sprouting grain. The entire process is completed in 192 hours and the barley malt is now ready to be dried at elevated temperatures and further treated in conventional manner.

Thus, after 192 hours, the grain which now has become green malt is dried with an air current having an air temperature of between 50 and 60° C. when contacting the green malt, and thereafter the green malt is subjected to cooking for four hours at between 80 and 85° C. and thereby the malting process is completed.

The water which fills the buckets for the immersion of grain therein is passed through a flexible pipe to a fixed pipe on top of the apparatus and the fixed pipe is perforated for the purpose of filling the buckets.

A row of sprayers as illustrated, is spaced at a distance of between 50 centimeters and 1 meter from the point where the grains drop out of the buckets so that the whole surface of the stream of dropping grains will be sprayed. This row of sprayers receives water through a flexible pipe and a manometer is arranged in the conduit for controlling the amount of water.

The circulating air which is to pass through the grain layer in the germinating bin is provided by means of a fan and its temperature is controlled by a cooling or heating device as required in order to obtain the desired air temperature. The relative humidity of the air which contacts the grain is maintained as close as possible to 100%.

When the grain is immersed in water for half a minute or so and then immediately withdrawn, a film of water continues to adhere to each grain. This quantity of water which adheres to the grain is approximately 11 kilograms of water per 100 kilograms of grain having a moisture content of 14%. This applies to the first immersion. In the case of subsequent immersion, the quantity of water which continues to adhere to the grain is approximately 13% of the quantity of steeped barley. These figures can be checked by weighing prior to and after immersion of the barley which has been partially steeped but which no longer has any water adhering thereto. Should it be required to do so, it is thus possible to regulate the steeping by varying the number of immersions as well as the time intervals between immersions.

The immersion operations are performed at the commencement of the steeping process when the water absorption rate is high and may reach 30% in 12 hours. Then, depending upon the year, the sensitivity to water and other factors, the steeping process is continued by sprinkling the grain freely dropping after discharge from the buckets in a fine layer for two reasons, namely in order that each grain should receive an equal quantity of water and, furthermore, in order that this quantity may be small and exactly controlled at any moment of the germinating process and that each grain is not entirely coated with a film of water. In fact, when the moisture content of the grain reaches 40% and it no longer has any adhering water, a single immersion would cause the moisture content to increase to 45%, whereas the sprinkling process permits the moisture content to rise less abruptly by 0.5%, 1% or 2% for example from 45% to 46%.

The grain commences to germinate at a moisture content of 34% and a moisture content of 36.5% is sufficient to insure sprouting of 99% of the grain.

The vital activity of the grain, the respiratory process and rise in temperature, accordingly increase at a very rapid rate and the increase in temperature may in fact reach 1° C. per hour during the steeping process, whereas under conventional steeping conditions, this degree of vitality is obtained only after three to four days of germination. The vital activity increases with increase in the moisture content and as an increase occurs in the rate at which carbon dioxide is eliminated and replaced by oxygen. Since the development of enzymes which is an object at the commencement of the germinating process as described parallels this vital activity, the maltster will be able to achieve the formation of enzymes by controlling the water supply in addition to air and temperature, in order to direct and maintain the above described vital activity of the germ. He will thus obtain an activity which is at least comparable with that obtained with other methods and he will achieve this result with less moisture at the commencement of the germinating process. This is made possible by virtue of the fact that the grain is not immersed except for a few very short periods and can therefore be supplied with all the air which it requires.

Once the enzymes have been formed, the grain is brought to the solubilization stage which is a hydrolysis process in which the carbohydrates of the grain, such as starch, are broken down. The molecular weight of the contents of the kernel will therefore decrease, thereby increasing its osmotic pressure and the water of the rootlets will return from the rootlets into the interior of the kernel. In the language of the trade, the malt is "withered" at the end of the germinating process and its vitality is diminished. The moisture content of the rootlet is reduced from 88% water to approximately 75%. In order to assist this process of hydrolysis, water will be added in small quantities and in a uniform manner by again spraying the barley freely dropping in a thin layer with water as indicated by the fourth and fifth spraying in FIG. 5.

Accordingly, during the enzyme development stage the malster supplies the grain with a minimum quantity of water and at the same time obtains the maximum activity that is desired and in the other stage, the maltster is enabled by sprinkling the grain while the same drops in a thin layer with water to assist the hydrolysis process at the end of the germination, namely, during the last two days of the process.

By following substantially the process illustrated in in FIG. 5 but starting with barley having a moisture content of 14%, 69,500 kilograms of malt having a moisture content of 4.4% were produced of 82,800 kilograms of barley, thus, on a dry basis a yield of 93.5% was obtained whereas by the conventional sequential steeping followed by germinating the expected yield would have been only about 90%.

The barley portions were subjected to immersion four times for 30 seconds and each time 33 cubic meters of water were required for immersing the 82,800 kilograms of barley in individual small quantities in the buckets of the apparatus. Approximately 20 cubic meters of water were required for the sprinkling of the grain discharged from the buckets so that the total water requirements were 140 cubic meters equal to about 200 liters per quintal of barley, or about one-fourth of the conventionally required amount of water.

The present invention will not only produce better malt, but will also produce larger quantities of malt per unit of space and time. Steeping tanks should not be deeper than 3 meters and their capacity is therefore limited. Moreover, the desired aeration of barley which is steeped in a tank is not easy to achieve. Since steeped barely must subsequently germinate in a bin for a period of seven days and since the new method permits the barley to be steeped in the bin and to germinate therein within seven days, the present method dispenses with any further need for tanks, i.e. steeping tanks, without thereby reducing the capacity of the malting plant.

Thus, the present method provides for adding water at any desired moment of the malt production process prior to the drying stage, while the quantity of water can be very small and can be added in a uniform manner, i.e. so that each grain is uniformly wetter. Furthermore, no problems exist with regard to aeration of the grain during the entire production process and finally, no further inconvenience can be caused by any limitation of steep tank capacity which in the literature is recommended not to exceed 15,000 and 20,000 kilograms per tank. Generally each immersion of the grain in the buckets of the apparatus will last between about 30 seconds and five minutes and more frequently the immersion time will be closer to the lower limit. The resting periods between the individual watering steps may vary between about five hours and three days and generally follow the proportions indicated in FIG. 5. The total number of immersions and sprayings combined may vary between about six and ten. In the illustrated manner of carrying out the invention it will be seen that the grain is first immersed three times and then sprayed three times and then after the long resting period spraying is repeated at about 132 hours and 155 hours after the start of the process.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A malting process including the steps of causing grain to drop freely from a higher to a lower level; spraying the freely dropping grain with an acqueous liquid so as to cause substantially direct contact between said liquid and the grain and uniform moistening of the individual kernels thereof and repeating at spaced time intervals said dropping and spraying steps.

2. A process as defined in claim 1, wherein said grain is barley.

3. A process as defined in claim 1, wherein said grain, substantially immediately prior to the free drop thereof, is immersed in an aqueous liquid.

4. A process as defined in claim 3, wherein the steps of immersing and spraying are repeated and the grain is allowed to rest after each spraying and prior to the subsequent immersing thereof.

5. A process as defined in claim 4, wherein said grain is barely.

6. A malting process including the steps of repeatedly immersing barely at spaced intervals in an aqueous liquid for periods of time, respectively, sufficient only to increase the water content of the barley by a fraction of the total increase in water content intended during the malting process; causing after at least one immersing the thus treated barley to drop freely from a higher to a lower level while spraying the freely dropping barley with an aqueous liquid so as to cause substantially direct contact between said liquid and the grain and uniform further moistening of the individual kernels thereof; and allowing the thus sprayed barley to rest in contact with air prior to being again contacted with aqueous liquid.

7. A process as defined in claim 6, wherein said immersion is carried out at spaced intervals of between about 5 and 24 hours, and said spraying is carried out at spaced intervals of between about 5 hours and 3 days.

8. A process as defined in claim 7, wherein each of said immersions is carried out for a period of between 30 seconds and 30 minutes.

9. A process as defined in claim 8, wherein each of said immersions is carried out for a period of up to about 1 minute.

10. A malting process including the steps of repeatedly immersing barley at spaced intervals in an aqueous liquid for periods of time, respectively, sufficient only to increase the water content of the barley by a fraction of the total increase in water content intended during the malting process, causing after at least one immersing the thus treated barley to drop freely from a higher to a lower level while spraying the freely dropping barley with an aqueous liquid so as to substantially evenly further moisten the individual kernels thereof; and allowing the thus sprayed barley to rest at said lower level in contact with air, prior to being against contacted with aqueous liquid; and thereafter raising said barley to said higher level during immersion thereof.

11. A malting process including the steps of repeatedly immersing barley at spaced intervals in an aqueous liquid for periods of time, respectively, sufficient only to increase the water content of the barley by a fraction of the total increase in water content intended during the malting process, causing after at least one immersing the thus treated barley to drop freely from a higher to a lower level while spraying the freely dropping barley with an aqueous liquid so as to substantially evenly further moisten the individual kernels thereof; and allowing thus thus sprayed barley to rest at said lower level in contact with air, prior to being again contacted with aqueous liquid; and thereafter raising said barley to said higher level prior to a subsequent immersion thereof.

12. A malting process including the steps of repeatedly immersing barley at spaced intervals in an aqueous liquid for periods of time, respectively sufficient only to increase the water content of the barley by a fraction of the total increase in water content intended during the malting process; causing the thus treated barley after at least one immersing to drop freely from a higher to a lower level while spraying the freely dropping barley with an aqueous liquid so as to substantially evenly further moisten the individual kernels thereof; allowing the thus sprayed barley to rest in contact wtih air prior to being again contacted with aqueous liquid, said immersing being carried out at spaced intervals of between about 5 and 24 hours, and said spraying being carried out at spaced intervals of between about 5 hours and 3 days, thereby causing simultaneous steeping and germinating of said barley; and drying the thus steeped and germinated barley at an elevated temperature.

References Cited

UNITED STATES PATENTS

| | | | |
|---|---|---|---|
| 672,843 | 4/1901 | Renner | 195—130 |
| 954,889 | 4/1910 | Schneible | 195—101 |
| 2,998,351 | 8/1961 | Stoddart et al. | 195—71 |

FOREIGN PATENTS

| | | |
|---|---|---|
| 858,389 | 1/1961 | Great Britain. |

M. W. GREENSTEIN, *Primary Examiner.*